2 Sheets—Sheet 2.

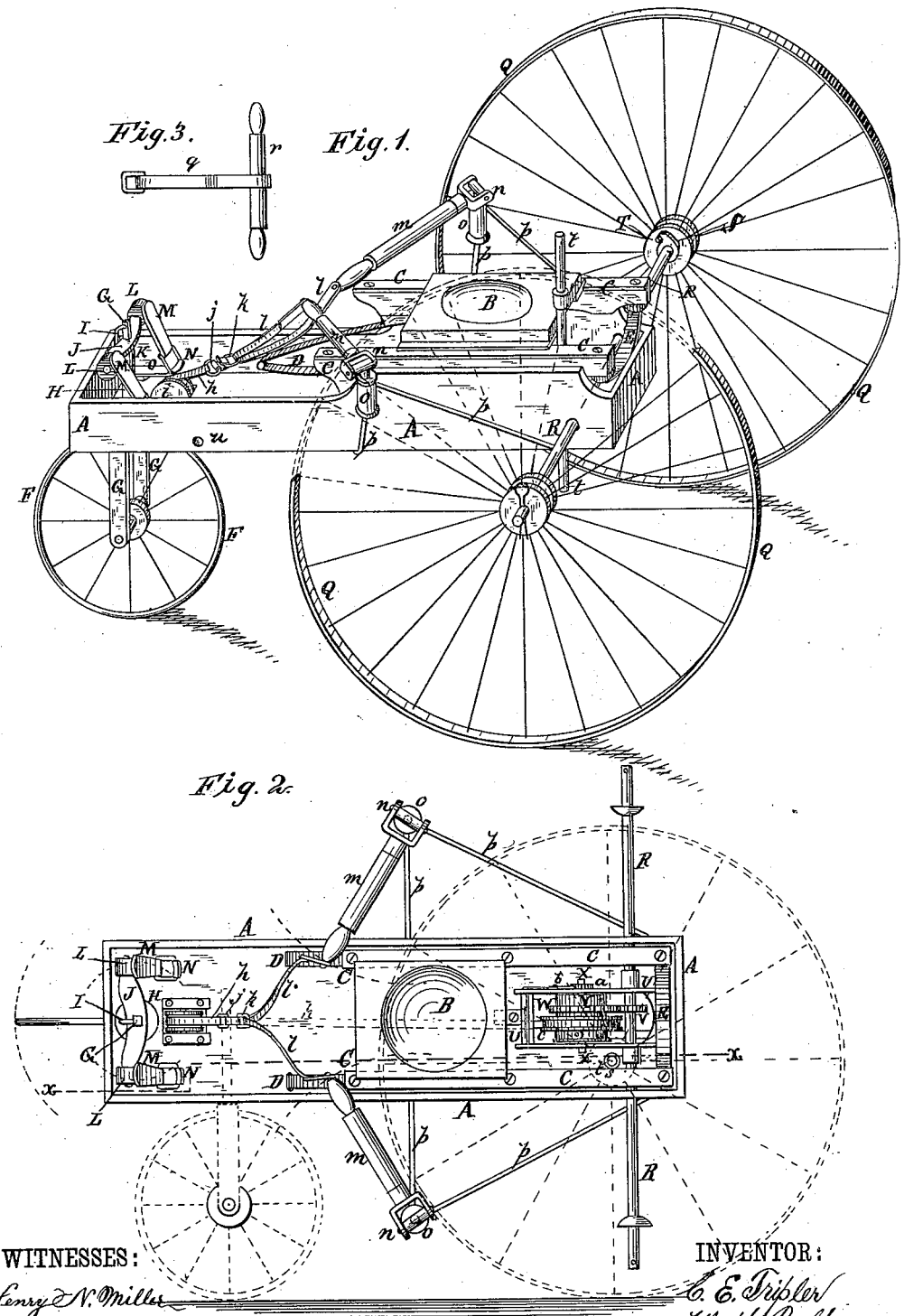

C. E. TRIPLER & W. H. ROFF.
Rowing Vehicle.

No. 230,838. Patented Aug. 3, 1880.

WITNESSES:
Henry N. Miller
C. Sedgwick

INVENTOR:
C. E. Tripler
W. H. Roff
BY Munn & Co
ATTORNEYS.

UNITED STATES PATENT OFFICE.

CHARLES E. TRIPLER AND WILLIAM H. ROFF, OF NEW YORK, N. Y.

ROWING-VEHICLE.

SPECIFICATION forming part of Letters Patent No. 230,838, dated August 3, 1880.

Application filed January 6, 1880.

*To all whom it may concern:*

Be it known that we, CHARLES E. TRIPLER and WILLIAM H. ROFF, of the city, county, and State of New York, have invented a new and useful Improvement in Rowing-Vehicles, of which the following is a specification.

Figure 4:
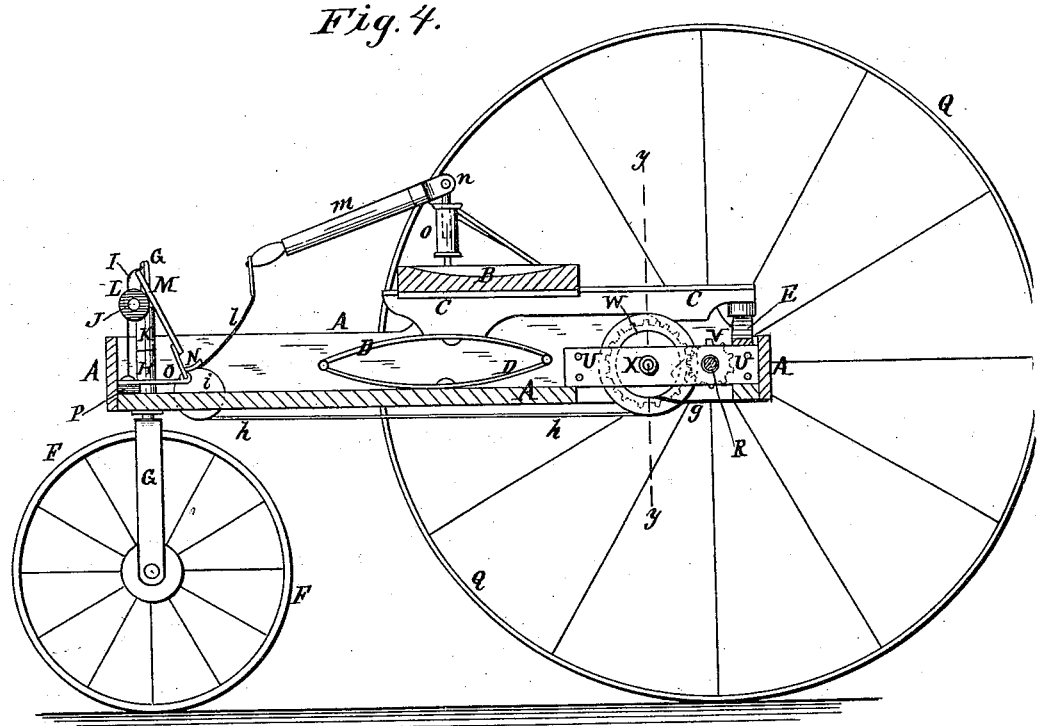
Figure 5:
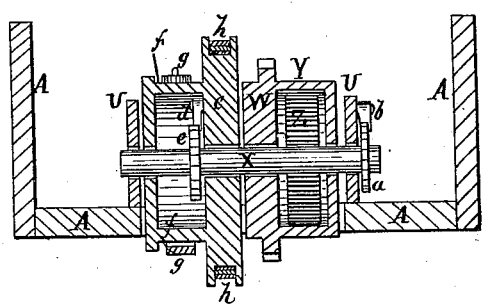
Figure 6:
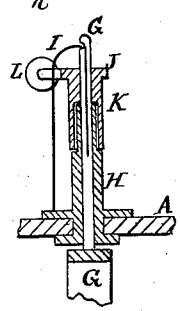

Figure 1, Sheet 1, is a perspective view of the improvement. Figure 2, Sheet 1, is a plan view of the body, showing in dotted lines the position of the wheels when arranged for being taken through a doorway. Fig. 3, Sheet 1, represents a pull-strap and handles. Fig. 4, Sheet 2, is a sectional side elevation taken through the line $x\,x$, Fig. 2. Fig. 5, Sheet 2, is a sectional elevation taken through the line $y\,y$, Fig. 4. Fig. 6, Sheet 2, is a sectional elevation of the steering-wheel bearings.

Similar letters of reference indicate corresponding parts.

The object of this invention is to furnish wheeled vehicles that are operated by hand-levers, and so moved that the operator, in propelling the vehicles, pulls the hand-levers in substantially the same manner that the oars of a boat are pulled.

A represents the body of the vehicle, which may be made in the shape of the body of a road-wagon or in any other desired shape.

B is the operator's seat, which rests and slides upon two bars, C, placed longitudinally with, and at the inner sides of, the sides of the body A. The forward parts of the bars C rest upon and are secured to two springs, D, which are secured to the body A. The rear ends of the bars C rest upon and are secured to the ends of a cross-spring, E, which is secured to the body A, or to a support attached to the said body. The forward end of the body A is supported by the steering-wheel F, which is pivoted to the forked lower end of the standard G.

The upper part of the standard G is made round and works in a tubular socket, H, attached to the forward part of the bottom of the body A, where it is held in place, if desired, by a spring-catch, I, which engages with a notch or groove in the upper end of the said standard. The standard G may be held from dropping out by any other desired catch or fastening. The upper end of the standard G is made square and fits into a square hole in the center of the cross-bar J.

To the lower side of the center of the cross-bar J is attached a sleeve, K, which fits upon the upper end of the socket H, so that the cross-bar J may turn upon the socket H to turn the steering-wheel F, and thus guide the vehicle. The ends of the cross-bar J are made round, and upon them are placed rubber cylinders, L, for the toe-plates or pedals M of the foot-rests to bear against, so that the bar J may be turned to guide the vehicle by the operator with his feet. The toe-plates M are hinged to the heel-plates N, which are rigidly attached to the rear ends of the springs O. The forward ends of the springs O are attached to the bottom of the body A, rubber blocks P being interposed between them and the said bottom to give the said springs O greater elasticity.

With this construction the operator guides the vehicle by the movement of the forward parts of his feet, the heels remaining stationary. With this construction, also, should the wheel F strike an obstruction, the springs L O P will receive the jar, and by their elasticity will protect the operator's feet from the shock.

The rear end of the body A is supported by the wheels Q, placed upon the journals of the axle R.

To the axle R are attached ratchet-wheels S, made with one or more teeth, which engage with pins or other pawls, T, attached to the inner ends of the hubs of the wheels Q, so that the said axle R will carry the said wheels Q with it in its revolution. The axle R works in bearings in a small frame, U, attached to the rear part of the bottom of the body A.

To the middle part of the axle R is attached a small gear-wheel, V, the teeth of which mesh into the teeth of a larger gear-wheel, W, which works loose upon the shaft X.

To one side of the wheel W is attached, or upon it is formed, a drum, Y, within which is coiled a spring, Z. One end of the spring Z is connected with the gear-wheel W, and its other end is connected with the shaft X, so that the revolution of the shaft X will coil the spring Z and the uncoiling of the spring Z will revolve the gear-wheel W, and thus give motion to the wheels Q.

The shaft X revolves in bearings in the frame U, and to one of its ends is attached a ratchet-wheel, $a$, with the teeth of which engages a pawl, $b$, attached to the frame U.

The ratchet-wheel $a$ and pawl $b$ hold the shaft from being turned back by the uncoiling of the spring Z, while allowing it to be turned forward freely to coil the said spring Z. Upon the shaft X at the side of the gear-wheel W is placed a loose wheel, $c$, to the side of which is pivoted a pawl, $d$. The pawl $d$ engages with the teeth of a ratchet-wheel, $e$, attached to the shaft X, so that the said shaft X will be turned to coil the spring Z by turning the wheel $c$, and so that the wheel $c$ may be turned back to receive a new impulse without carrying the shaft X with it.

To the side of the wheel $c$ is attached a drum, $f$, which covers the pawl $d$ and ratchet $e$, and to which is attached the end of a strap, $g$, the other end of which is attached to the body A, and which is made elastic or is connected with a spring, so that its elasticity may turn the wheel $c$ back to receive another impulse.

The face of the wheel $c$ is grooved to receive the strap $h$, one end of which is attached to the said wheel $c$. The strap $h$ passes forward beneath the vehicle-body A, passes up through a hole in the forward part of the bottom of the body A, and around a pulley, $i$, pivoted to the said bottom within the said hole.

With the end of the strap $h$ is connected, by a hook, $j$, and ring $k$, or other suitable connection, the end of the branched strap $l$, the ends of the branches of which are pivoted to the ends of a pair of bars or levers, $m$, which, for convenience, we will call "oars," and which are swiveled at their other ends to the upper part of the hinged coupling $n$. The lower part of the hinged coupling $n$ is swiveled in a socket, $o$, which is attached to the outer ends of the rods $p$. The inner ends of the rods $p$ are attached to the body A, and the said rods are made of such a length as will bring the pivoting-points of the oars $m$ to a proper distance from the operator's seat B.

With this construction the operator can obtain all the motions required in rowing, even to feathering the oars.

If desired, the branched strap $l$ and the oars $m$ may be omitted and replaced by a short strap, $q$, having a cross-bar handle, $r$, attached to its other end, so as to obtain a direct pull in applying power to the mechanism.

With this construction, when the strap $h$ is drawn upon the wheel $c$ is turned forward, turning the shaft X and coiling the spring Z. As the strap $h$ is relaxed the spring-strap $g$ draws the wheel $c$ back ready to receive another impulse, while the uncoiling of the spring Z gives a continuous forward movement to the wheels Q, carrying the vehicle forward with more or less speed, according as more or less power is applied to the strap $h$, so that a continuous forward movement will be obtained by an intermittent application of power.

In a hole in the rear part of the bottom of the body A is secured a socket, $s$, to receive a short axle, $t$, upon the journals of which the wheels Q are placed when it is desired to take the vehicle through a doorway or other narrow passage-way. In this case the standard G of the steering-wheel F is withdrawn from the socket H and inserted in a hole, $u$, in the forward part of one side of the body A, as indicated in dotted lines in Fig. 2.

We have shown and described the improvement as applied to land vehicles; but the same mechanism may be used for the propulsion of boats, the wheels in this case being provided with paddles.

Having thus described our invention, we claim as new and desire to secure by Letters Patent—

1. In a rowing-vehicle, the combination, with the axle R, of the gear-wheels V W, the shaft X, the coiled spring Z, the ratchets and pawls $a\ b$ and $e\ d$, the wheel $c$, the spring-strap $g$, and the draw-strap $h$, substantially as herein shown and described, whereby a continuous motion is given to the wagon by an intermittent application of power, as set forth.

2. In a rowing-vehicle, the combination, with the steering-wheel standard G, of the cross-bar J, carrying rubber blocks L upon its ends, the hinged toe-plates M, the stationary heel-plates N, and the supporting-springs O P, substantially as herein shown and described, whereby the operator can guide the vehicle with his feet without being liable to receive a shock should the steering-wheel F strike an obstruction, as set forth.

3. In a rowing-vehicle, the combination, with the body A and with the strap $h$, by means of which power is applied to the driving mechanism, of the branched strap $l$, the swiveled oars $m$, the swiveled hinge-connections $n$, and the socket $o$, supported from the vehicle-body, substantially as herein shown and described, whereby the operator may apply power to the driving mechanism by the same movements as are used in rowing, as set forth.

4. In a rowing-vehicle, the combination, with the body A, of the sliding seat B, the bars C, and their supporting-springs D E, substantially as herein shown and described, to give the advantage of a sliding seat to the operator, as set forth.

5. In a rowing-vehicle, the combination, with the body A, of the short axle $t$, placed at right angles with the axle R, substantially as herein shown and described, to receive the wheels Q when the vehicle is to be taken through a doorway, as set forth.

CHARLES E. TRIPLER.
WILLIAM H. ROFF.

Witnesses:
JAMES T. GRAHAM,
J. H. SCARBOROUGH.